(12) United States Patent
Zhang (10) Patent No.: US 7,385,614 B2
(45) Date of Patent: Jun. 10, 2008

(54) COMPOSITING IMAGES USING LOGICALLY DIVIDED OBJECT SPACE

(75) Inventor: Hansong Zhang, Cupertino, CA (US)

(73) Assignee: Silicon Graphics, Inc., Sunnyvale, CA (US)

( * ) Notice: Subject to any disclaimer, the term of this patent is extended or adjusted under 35 U.S.C. 154(b) by 208 days.

(21) Appl. No.: 11/091,237

(22) Filed: Mar. 28, 2005

(65) Prior Publication Data

US 2006/0214949 A1    Sep. 28, 2006

(51) Int. Cl.
*G09G 5/00* (2006.01)
(52) U.S. Cl. .................. 345/629; 345/419; 345/421; 345/423; 345/502
(58) Field of Classification Search ............ 345/421, 345/423, 419, 629, 502
See application file for complete search history.

(56) References Cited

U.S. PATENT DOCUMENTS 4,694,404 A * 9/1987 Meagher .................... 345/421
4,737,921 A * 4/1988 Goldwasser et al. ........ 345/421
4,821,210 A * 4/1989 Rumbaugh .................. 345/421

OTHER PUBLICATIONS

Foley, James D., "Extents and Bounding Volumes", "The Depth-Sort-Algorithm", and "Object-Parallel Rasterization", (Book)—Computer Graphics Principles and Practice, 2nd Edition in C, (1997) pp. 660-663, 673-675, and 899-900.*
*A Recursive Approach for Octree Traversal*, tripod, online <http://chiranjivi.tripod.com/octrav.html>, Retrieved on Jan. 20, 2005, 12 pages.

* cited by examiner

*Primary Examiner*—Kimbinh T. Nguyen
(74) *Attorney, Agent, or Firm*—Bromberg & Sunstein LLP (57) ABSTRACT

An apparatus and method of processing object data (e.g., a scene having one or more objects) logically divide the object space into a plurality of contiguous (or noncontiguous) portions. At least two portions each have object data for such object(s). The apparatus and method also determine a positional priority of the at least two portions of the object space for a given viewpoint. Next, the apparatus and method merge rendered object data after at least some of the object data is rendered. This merging is based upon the positional priority of the at least two portions.

24 Claims, 5 Drawing Sheets

COMPOSITING IMAGES USING LOGICALLY DIVIDED OBJECT SPACE

FIELD OF THE INVENTION

The invention generally relates to graphics processing and, more particularly, the invention relates to image composition and decomposition.

BACKGROUND OF THE INVENTION

Many computer systems have a specialized graphics processing system for producing vivid graphical images. At the core of these subsystems typically is a graphics processor that processes graphical data in a highly streamlined manner. In simplified terms, the graphics processor converts substantially unprocessed graphical data into a format that can be displayed on a conventional display device (e.g., a cathode ray tube display or a liquid crystal display).

To improve the efficiency and speed of the rendering process, many currently available graphics processing systems distribute scene rendering tasks among multiple rendering devices. Among the other ways, some systems distribute the specific objects in a scene to different devices. For example, when rendering a scene having buildings and cars, such systems may have a first device render the buildings, and a second device render the cars. After completing their respective tasks, both devices forward their rendered objects to a compositor, which combines the received image data (i.e., rendered object data) into a single scene.

To combine the specific images, however, the compositor must compare depth data for each received object. In particular, continuing with the above example, if some of the rendered object data of a building and car intersect the same pixel, then the compositor must analyze the depth data for both of those objects to determine which one is in the foreground. One problem with this process, however, is that depth data for all rendered objects must be transmitted and/or processed. In addition to requiring many depth computations, this excess of data can create a bottleneck in the system, thus further increasing processing time. Many graphical applications, however, such as a real-time display applications, cannot tolerate such inefficiencies.

SUMMARY OF THE INVENTION

In accordance with one aspect of the invention, an apparatus and method of processing object data (e.g., a scene having one or more objects) logically divide the object space into a plurality of contiguous (or noncontiguous) portions. At least two portions each have object data for such object(s). The apparatus and method also determine a positional priority of the at least two portions of the object space for a given viewpoint. Next, the apparatus and method merge rendered object data after at least some of the object data is rendered. This merging is based upon the positional priority of the at least two portions.

In some embodiments, a plurality of rendering devices render the object data. Each rendering device renders the object data in at least one of the at least two portions. Moreover, each of the plurality of contiguous portions illustratively comprises a three dimensional volume. In addition, among other things, the object data may include tessellated objects. For example, the objects may be tessellated with triangles. The priority determination may be made in a number of ways, such as by determining the relative positions of the at least two portions.

After merging the rendered object data, the apparatus and method may display the resultant image on a display device from the given viewpoint. In some embodiments, the at least two portions include a first portion that has priority over a second portion. In this case, when both the first rendered object data (from the first portion) and second rendered object data (from the second portion) intersect a given pixel of the display device, the pixel displays the first rendered object data only (if no other rendered object data having a higher priority is in its foreground).

The apparatus and method may use any one of a number of methods to logically divide the object space. For example, the object space may be logically divided by forming clipping planes directly in object space. The clipping planes define the boundaries of the portions, thus logically dividing the object data into mutually exclusive parts.

In accordance with another aspect of the invention, an apparatus and method of processing an object also determine a positional priority for use in a subsequent merging step. Specifically, when processing an object having a geometric representation (i.e., object data) in an object space that is logically divided into a plurality of contiguous portions, and at least two of the portions each have object data, the apparatus and method determine the positional priority of the at least two portions of the object space for a given viewpoint. The apparatus and method then merge the rendered object data after at least some of the object data is rendered. This merging is based upon the positional priority of the at least two portions.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing advantages of the invention will be appreciated more fully from the following further description thereof with reference to the accompanying drawings wherein.

DESCRIPTION OF ILLUSTRATIVE EMBODIMENTS

Illustrative embodiments of the invention eliminate the need for depth data when compositing portions of a single, distributively rendered scene. To that end, various embodiments divide the object space into multiple portions that each may contain object data of a scene having one or more objects. The object data in each of the object space portions then are distributed to multiple rendering devices for rendering. When merging the rendered object data (i.e., image data) to produce the final image, rather than use depth data, a compositor simply uses the positional priority of each object space portion to determine which objects (or portions of objects) are in the foreground of the image. By using the positional priority information in this manner, the compositor can merge the image data without executing computationally intensive pixel by pixel data analyses of the image. Details of illustrative embodiments are discussed below.

Figure 1:
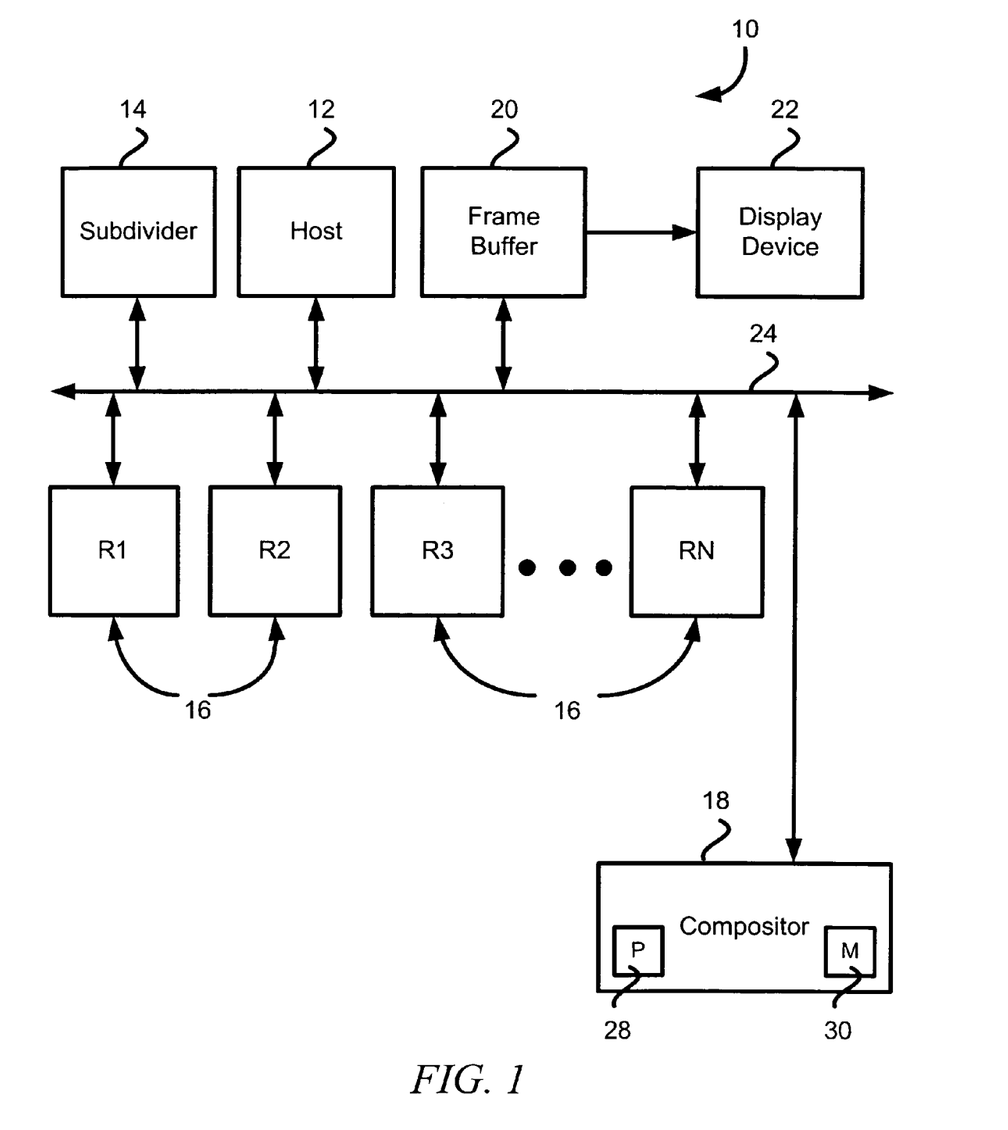
FIG. 1 schematically shows a hard-wired distributed rendering system that may be configured in accordance with illustrative embodiments of the invention.

FIG. 1 schematically shows a hard-wired, distributed rendering system 10 that may be configured to composite image data without using depth information. To that end, the rendering system 10 has a host 12 for forming a scene (having one or more objects) in object space, a subdivider 14 for dividing the object space into a plurality of portions (e.g., blocks), and a plurality of corresponding rendering devices 16 for rendering object data in each portion of the object space. The rendering devices 16 may be any rendering devices (e.g., personal computers and/or workstations) capable of rendering at least a portion of the scene. For example, the rendering devices 16 may be Silicon Graphics OCTANE2 Visual Workstations, distributed by Silicon Graphics, Inc. of Mountain View, Calif. In other embodiments, some or all of the rendering devices 16 are different graphics cards within a single machine. In yet other embodiments, all of the components of the rendering system 10 are within a single computer.

In addition, the rendering system 10 also has a compositor 18 for merging rendered object data (i.e., image data) received from the rendering devices 16. As discussed in greater detail with regard to FIG. 3, the compositor 18 builds an image in a double buffered frame buffer 20 for ultimate display on a display device 22 (e.g., a cathode ray tube device or liquid crystal display). Of course, the rendering system 10 may have additional components that are not shown. For example, the system also may have memory for storing the rendered object data before, during, or after compositing. In illustrative embodiments, the rendering system 10 implements the OPENGL standard, developed by Silicon Graphics, Inc. Accordingly, when using this or a similar standard, the geometric representation of objects (i.e., object data) to be displayed are formed as a plurality of polygons (e.g., triangles) in object space prior to rendering. Some embodiments use other rendering technology, such as ray tracing.

The various components of the rendering system 10 shown in FIG. 1 communicate across a central communication apparatus, such as a bus 24. It should be noted, however, that other means may be used to interconnect the various components of the rendering system 10. Accordingly, the bus 24 is shown as but one example of many different types of interconnection devices.

Figure 2:
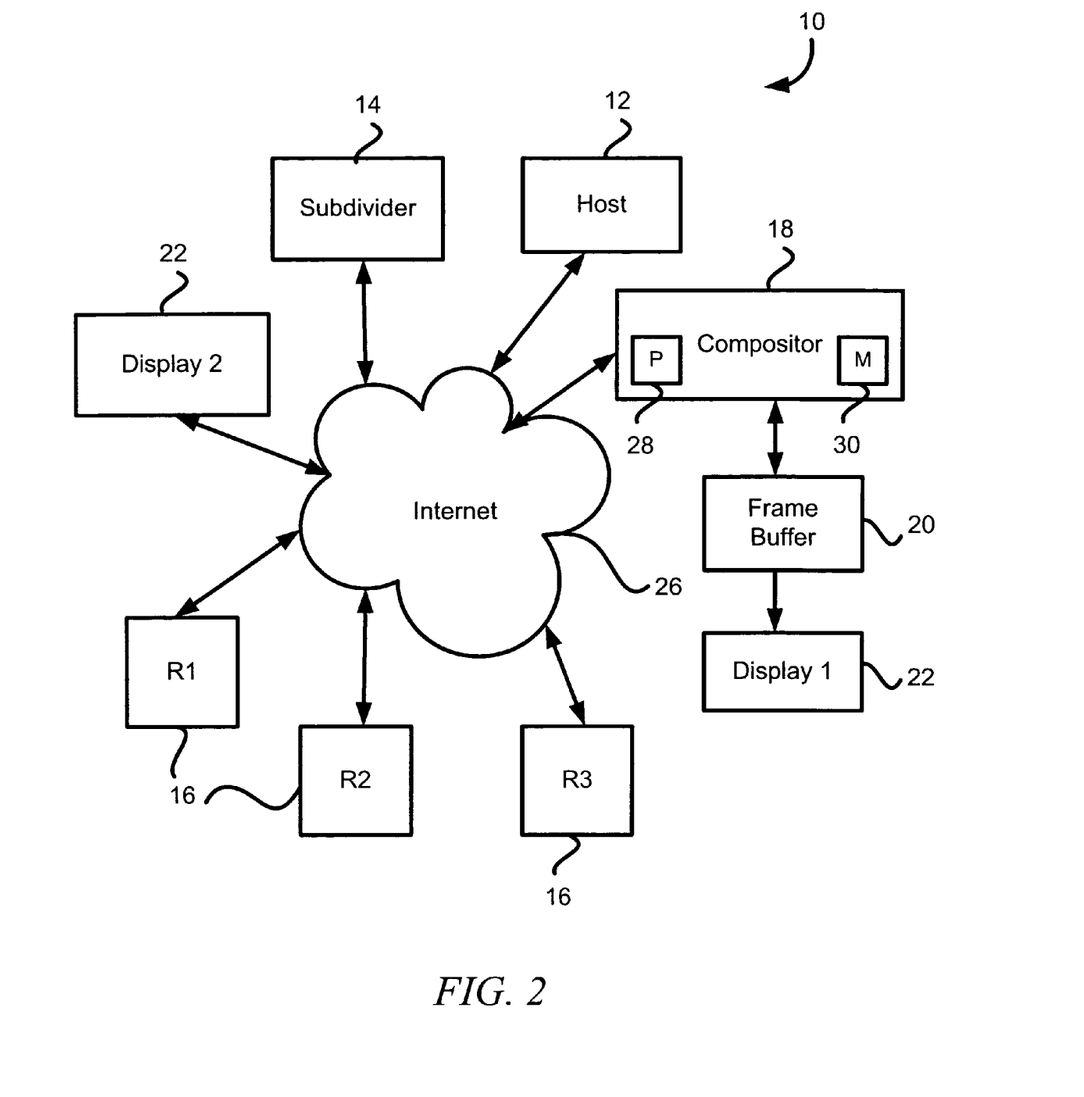
FIG. 2 schematically shows a logically connected distributed rendering system that also may be configured in accordance with illustrative embodiments of the invention.

FIG. 2 schematically shows a similar rendering system 10 that also may be configured to composite image data without depth information. In a manner unlike that shown in FIG. 1, the rendering system of FIG. 2 is distributed across a network, such as the Internet 26. Those skilled in the art should understand, however, that various embodiments can be implemented on hard-wired and distributed rendering systems other than those shown in FIGS. 1 and 2. Accordingly, the distributed rendering systems of FIGS. 1 and 2 are exemplary and not intended to limit various aspects of the invention.

Figure 3:
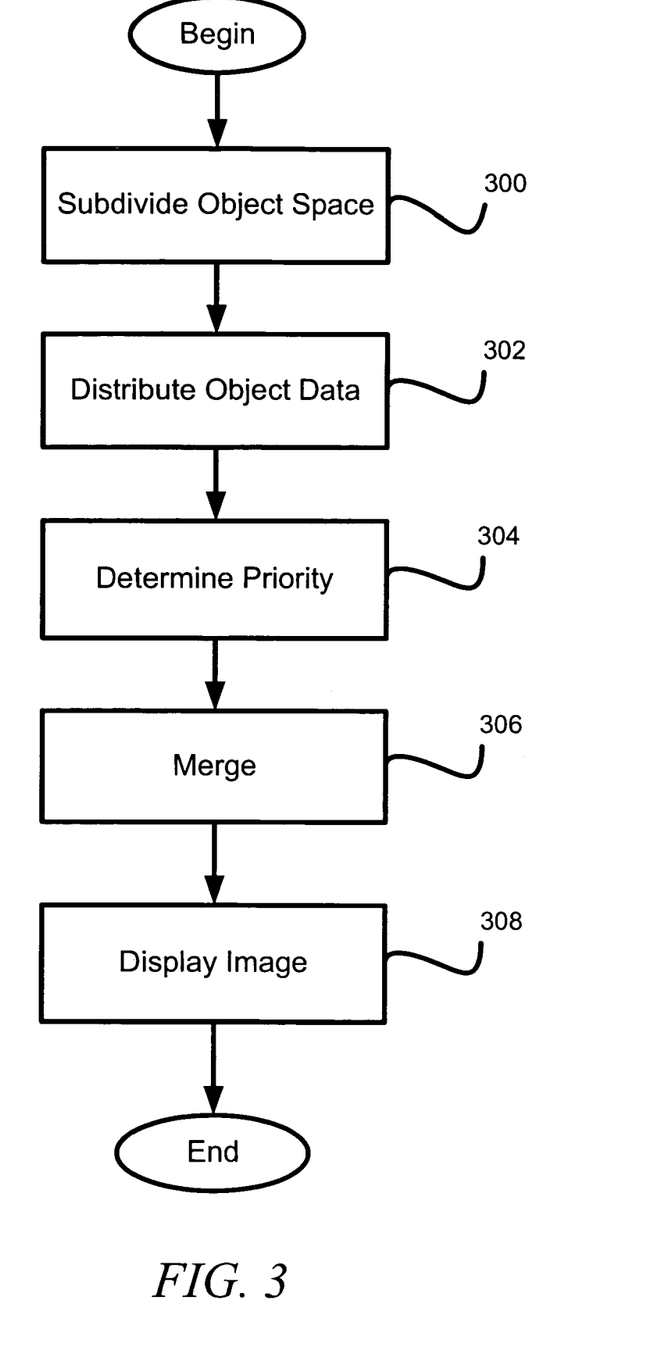
FIG. 3 shows a process of distributively rendering object data in accordance with illustrative embodiments of the invention.

FIG. 3 shows a process of distributively rendering object data (e.g., objects of a scene) in accordance with illustrative embodiments of the invention. Before or while beginning the process, however, the host 12 forms the geometric representation of the scene objects in object space (i.e., the host 12 forms a database having information relating to the objects to be displayed). Specifically, as known by those in the art, to form the geometric representation, the rendering system 10 (i.e., the host 12) defines the objects in the scene with a plurality of surfaces having some pre-defined shape (e.g., a polygon, such as a triangle), size, and contour. The data making up the geometric representation (e.g., triangle data in OPENGL systems) is referred to as "object data." This is in contrast to other representations, such as volumetric representations, which define objects as a plurality of points.

Figure 4:
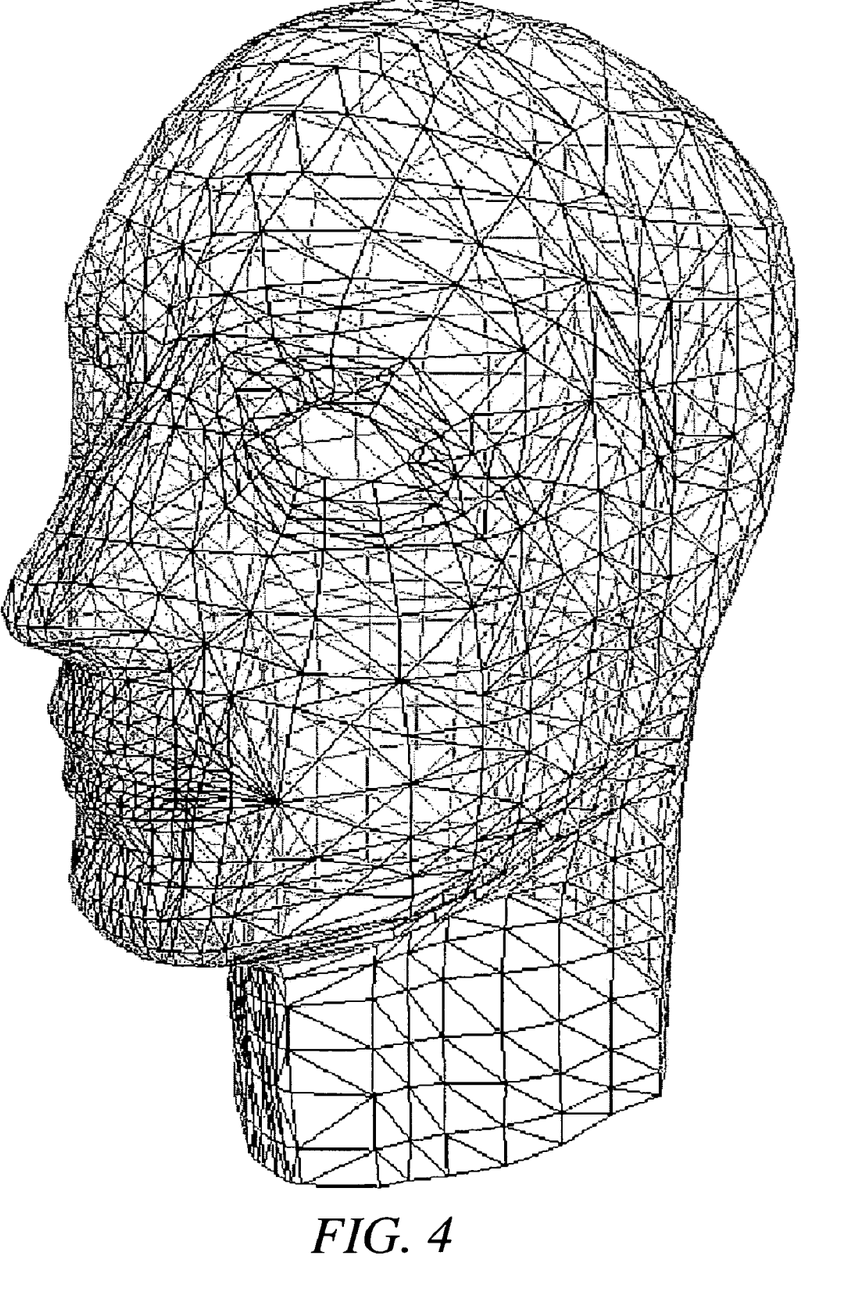
FIG. 4 schematically shows a geometric representation of an exemplary object.

To that end, when using the OPENGL standard, the rendering system 10 tessellates the objects with a plurality of triangles. As an example, FIG. 4 schematically shows a random object that has been tessellated in this manner. It should be reiterated, however, that other geometric representations may be used. Accordingly, discussion of triangle tessellation is exemplary and not intended to limit various aspects of the invention.

Figure 5:
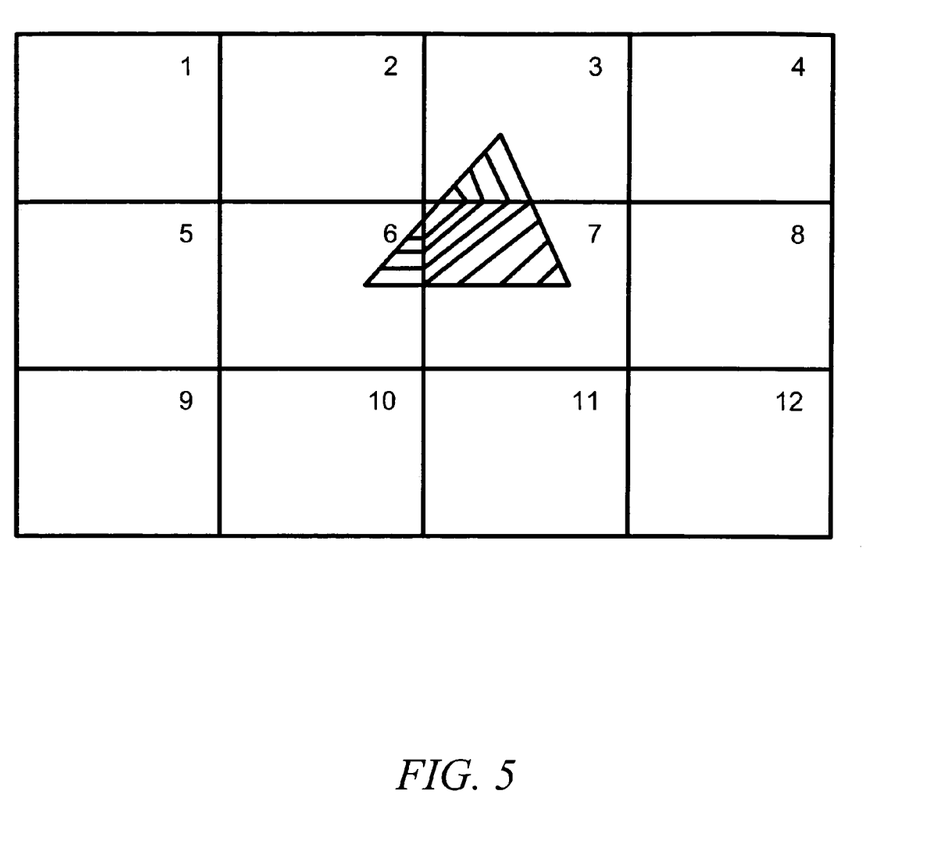
FIG. 5 schematically shows an example of a partitioned object space in two dimensions. This figure is illustrative and a simplification of a three-dimensional object space.

The process begins at step 300, which the subdivides the three-dimensional object space of the scene into a plurality of contiguous or noncontiguous portions. In illustrative embodiments, however, the portions are contiguous. By doing this, each contiguous portion may have some or no part of the object data making up the object. FIG. 5 schematically shows an example of a partitioned object space in two dimensions. This figure is illustrative and a simplification of a three-dimensional object space. Accordingly, its teachings can apply to a three-dimensional object space. In particular, the object space in FIG. 5 is divided into twelve portions identified as portion numbers 1 through 12. The object, which is a triangle in this example, intersects portions 3, 6, and 7. Accordingly, portions 3, 6, and 7 are considered to "contain "object data representing parts of the object. The remaining portions, however, do not contain any parts of the object.

To improve system efficiency, many of the portions that intersect objects preferably contain a similar amount of object data. Moreover, at least two portions should contain object data. The two or more portions having object data, however, are not necessarily contiguous. For example, a scene may have more than one object, such as the prior noted scene having both buildings and cars. The number, size, and shape of the portions therefore may be selected to accomplish those goals. For example, the portions may be an array of 200×100×50 rectangles. Of course, nonrectangular shapes and different numbers of portions may be used.

In illustrative embodiments, the subdivider 14 divides the object space by forming a plurality of intersecting planes. The prior discussed FIG. 5 shows one example of intersecting planes in two dimensions. As another example, six clipping planes can intersect to form one or more of the 3D object space portions. Those six clipping planes can include two parallel planes in the X-direction, two parallel planes in the Y-direction, and two parallel planes in the Z-direction. In yet other embodiments, the portions are some other, nonrectangular shape.

After the object space is subdivided, the object data in each of the portions are distributed to the various rendering devices 16 (step 302). This process may be referred to as "database decomposition." In particular, the object space is subdivided and may be viewed from any of an infinite number of viewpoints. As known by those skilled in the art, the image ultimately displayed on the display device 22 necessarily is taken from one viewpoint of the object space.

Accordingly, step 300 can be performed once, while the remaining steps 302-308 (discussed below) are repeated for each viewpoint.

The object data may be distributed to the rendering devices 16 in a random fashion, such as in a round robin manner, or in a predetermined manner. Load balancing should be taken into consideration. For example, the portions may be categorized based upon the total amount of object data that each one contains. The portions having the most object data therefore may be sent to the rendering devices 16 that have the most rendering power, while the portions having less object data may be sent to rendering devices 16 having less rendering power.

Using FIG. 5 as an example, the object data in portion three may be sent to a first rendering device 16, the object data in portion six may be sent to a second rendering device 16, and the object data in portion seven may be sent to a third rendering device 16. To further improve efficiency, a simple algorithm may determine which portions have object data and thus, prevent transmission of needless data (e.g., header data with no payload) to any of the rendering devices 16.

After they render the object data, the rendering devices 16 forward processed object data to the compositor 18 for display on the display device 22 (i.e., the compositor 18 gathers the rendered object data, which at this point in the process is image data). The process thus continues to step 304, in which the compositor 18 determines the positional priority of each of the portions from the given viewpoint. To perform this function, the compositor 18 may have a priority module 28 or similar device.

Specifically, the compositor 18 determines the relative location of each portion relative to the other portions in the object space to logically re-assemble the complete object space. Among other things, this relative location information may be part of the identification of each portion. The compositor 18 then logically orients the portions from the given viewpoint to determine which portions are in the foreground of the image to be displayed. Consequently, each portion may be assigned a positional priority value against which priority values of other portions may be compared. As noted below, this comparison determines which image data is to be in the foreground. It should be reiterated, however, that this priority value is distinct from depth data, such as Z-buffer data.

In alternative embodiments, the compositor 18 does not determine the positional priority. Instead, some other functional module, such as the subdivider 14, determines the positional priority of the portions and forwards that information to the compositor 18.

As suggested above, the priority module 28 may use any conventional means for determining the location of each portion relative to the other locations. For example, the object space may be divided as an adaptive spatial subdivision using an octree. When using this type of subdivision method, illustrative embodiments may begin by subdividing the object space into uniform portions (i.e., a 2×2×2 subdivision scheme). Next, illustrative embodiments may recursively subdivide each portion into eight portions, as necessary, in a similar manner. Each single portion that is subdivided is considered to be a parent portion to eight child portions. This recursive subdivision process may continue until some predetermined condition is met, such as when fewer than some amount of object data is within a single subdivided portion.

For a given viewpoint, priority determinations may be made after each parent is subdivided. Using this method simplifies the priority determination by requiring a comparison of eight portions only (for each set of portions to be compared). The priority determination may be made in a conventional manner, such as in the manner described in Appendix A.

The process then continues to step 306, in which the compositor 18 merges the rendered object data received from the rendering devices 16. Specifically, the compositor 18 has a merging module 30 that builds the image in the frame buffer 20 by determining which image data is visible from the given viewpoint. To that end, for pixels on the display device 22 having intersecting image data from two or more portions, the compositor 18 uses the positional priority data to determine which image data is in the foreground. For example, if rendered object data contained in a first portion has a higher priority than intersecting rendered object data from a second portion, then the pixel will illuminate the rendered object data in the first portion.

The process concludes at step 308, in which the image is displayed on the display device 22. In the example discussed, this step can be executed by means of a conventional frame buffer swap.

It should be noted that the order of the steps in the process can be varied. For example, priority can be determined (step 304) before the object data is distributed (step 302). In fact, in some embodiments, only object data that is predetermined to be visible may be distributed. Moreover, some steps, such as steps 302 and 304, can be executed substantially concurrently. The order of the steps in FIG. 3 therefore are exemplary and not intended to limit the scope of the invention.

Accordingly, illustrative embodiments enable a scene to be distributively rendered without the need for depth data when merging the specific parts back together. This optimization thus reduces 1) the total amount of data to be distributed throughout the system, and 2) the total number of computations required to render the ultimate image. Consequently, system performance should be capable of rendering graphical information, such as real time object data, in a more rapid and efficient manner.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and method may be implemented as a computer program product for use with a computer system. Such implementation may include a series of computer instructions fixed on a tangible medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other things, such a computer program product may be distributed as a removable medium with accompanying printed or electronic documentation (e.g., shrink wrapped software), preloaded with a computer system (e.g., on system ROM or fixed disk). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of processing polygonal object data within an object space, the method comprising:
    logically dividing using clipping planes the object space of the object data into a plurality of portions at least two portions each having polygonal object data for one object;
    determining a positional priority of the at least two portions of the object space for a given viewpoint;
    merging rendered polygonal object data after at least some of the polygonal object data is rendered, merging being based upon the positional priority of the at least two portions; and
    outputting the rendered polygonal object data for display on a display device from the given viewpoint.

2. The method as defined by claim 1 wherein a plurality of rendering devices render the polygonal object data, each rendering device rendering the polygonal object data in at least one of the at least two portions.

3. The method as defined by claim 1 wherein each of the plurality of portions comprises a three dimensional volume.

4. The method as defined by claim 1 wherein the polygonal object data comprises a plurality of surfaces that together form an object.

5. The method as defined by claim 1 wherein determining comprises determining relative positions of the at least two portions.

6. The method as defined by claim 1 further comprising:
    displaying the rendered polygonal object data on a display device from the given viewpoint.

7. The method as defined by claim 1 wherein the at least two portions include a first portion and a second portion, the first portion having positional priority over the second portion, the first portion having first rendered polygonal object data, the second portion having second rendered polygonal object data, both the first rendered polygonal object data and second rendered polygonal object data intersecting a given pixel of the display device, the pixel displaying the first rendered polygonal object data only.

8. An apparatus for processing polygonal object data having an object space, the apparatus comprising:
    a subdivider for logically dividing the object space of the polygonal object data into a plurality of contiguous portions by using clipping planes at least two portions each having polygonal object data for one object; and
    a compositor operatively coupled with the subdivider, the compositor being capable of determining a positional priority of the at least two portions of the object space for a given viewpoint, the compositor also merging rendered polygonal object data after at least some of the polygonal object data is rendered, the merging being based upon the positional priority of the at least two portions.

9. The apparatus as defined by claim 8 wherein a plurality of rendering devices render the polygonal object data, each rendering device rendering the polygonal object data in at least one of the at least two portions.

10. The apparatus as defined by claim 8 wherein each of the plurality of contiguous portions comprises a three dimensional volume.

11. The apparatus as defined by claim 8 wherein the object data comprises tessellated objects.

12. The apparatus as defined by claim 11 wherein the objects are tessellated with triangles.

13. The apparatus as defined by claim 8 wherein the compositor is capable of determining relative positions of the at least two portions for the given viewpoint.

14. The apparatus as defined by claim 8 wherein the compositor is capable of forwarding the merged rendered polygonal object data to a display device for display from the given viewpoint.

15. The apparatus as defined by claim 8 wherein the subdivider is capable of forming clipping planes in the object space, the clipping planes defining the boundaries of the portions, the clipping planes logically dividing the polygonal object data into mutually exclusive parts.

16. A computer program product for use on a computer system for processing object data having an object space, the computer program product comprising a computer usable tangible medium having computer readable program code thereon, the computer readable program code comprising:
    program code for logically dividing the object space of the object data into a plurality of portions using clipping planes, at least two portions each having object data for one object;
    program code for determining a positional priority of the at least two portions of the object space for a given viewpoint; and
    program code for merging rendered polygonal object data after at least some of the polygonal object data is rendered, the merging being based upon the positional priority of the at least two portions.

17. The computer program product as defined by claim 16 further comprising computer code for providing the polygonal object data for each portion of the logically divided object space to one of a plurality of rendering devices.

18. The computer program product as defined by claim 16 wherein each of the plurality of portions comprises a three dimensional volume.

19. The computer program product as defined by claim 16 wherein the polygonal object data comprises tessellated objects, the objects being tessellated with triangles.

20. The computer program product as defined by claim 16 wherein the program code for determining comprises program code for determining relative positions of the at least two portions.

21. The computer program product as defined by claim 16 further comprising program code for forwarding the rendered polygonal object data to a display device for display from the given viewpoint.

22. The computer program product as defined by claim 21 wherein the at least two portions include a first portion and a second portion, the first portion having positional priority over the second portion, the first portion having first rendered polygonal object data, the second portion having second rendered polygonal object data, both the first rendered polygonal object data and second rendered polygonal object data intersecting a given pixel of the display device, the pixel displaying the first rendered object data only.

23. The computer program product as defined by claim 16 wherein the program code for logically dividing comprises:
program code for forming clipping planes in object space, the clipping planes defining the boundaries of the portions, the clipping planes logically dividing the polygonal object data into mutually exclusive parts.

24. The computer program product as defined by claim 16 wherein the plurality of portions are contiguous.

* * * * *